United States Patent
Dunworth

(12) 
(10) Patent No.: US 6,491,190 B1
(45) Date of Patent: Dec. 10, 2002

(54) PERMEABLE REFRACTORY NOZZLE AND MANUFACTURING METHOD

(76) Inventor: Bruce E. Dunworth, 7916 Lake Ave., Cincinnati, OH (US) 45236

( * ) Notice: Subject to any disclaimer, the term of this patent is extended or adjusted under 35 U.S.C. 154(b) by 25 days.

(21) Appl. No.: 09/717,725

(22) Filed: Nov. 21, 2000

Related U.S. Application Data

(60) Provisional application No. 60/166,822, filed on Nov. 22, 1999.

(51) Int. Cl.$^7$ ................................................. B67D 5/00
(52) U.S. Cl. ........................................ 222/603; 266/220
(58) Field of Search .......................... 222/603; 266/220, 266/217, 236

(56) References Cited

U.S. PATENT DOCUMENTS

| | | |
|---|---|---|
| 4,253,590 A | 3/1981 | Holt et al. |
| 4,780,434 A | 10/1988 | Watanabe et al. |
| 4,989,762 A | 2/1991 | Ando et al. |
| 5,100,035 A | 3/1992 | Dunworth et al. |
| 5,250,479 A | 10/1993 | Rancoule et al. |
| 5,467,904 A * | 11/1995 | Shaw .......................... 222/603 |
| 5,614,450 A | 3/1997 | Britt |
| 5,637,541 A | 6/1997 | Kuszyk et al. |
| 5,744,050 A | 4/1998 | Shaw |
| 5,856,251 A | 1/1999 | Teranishi et al. |

* cited by examiner

Primary Examiner—Scott Kastler
(74) Attorney, Agent, or Firm—Wood, Herron & Evans, L.L.P.

(57) ABSTRACT

A permeable nozzle is made from MgO and MgO—$Al_2O_3$ spinel and has a nonservice backpressure of about 0.5–50 psi at gas flowrates of about 5–20 liters/minute. In one embodiment, the permeable nozzle comprises about 50%–80% of about a 20–48×100 mesh MgO, about 5%–20% of about a 325 mesh MgO and about 5%–40% of about a 48×200 mesh MgO—$Al_2O_3$ spinel. In another embodiment, the permeable nozzle comprises about 10%–20% of about a 20–48×100 mesh MgO, about 0%–10% of about a 325 mesh MgO, about 30%–60% of about a 28×48 mesh MgO—$Al_2O_3$ spinel, about 10%–40% of about a 48×200 mesh MgO—$Al_2O_3$ spinel, and about 10%–20% of about a 325 mesh MgO—$Al_2O_3$ spinel.

28 Claims, 1 Drawing Sheet

PERMEABLE REFRACTORY NOZZLE AND MANUFACTURING METHOD

This application claims the benefit of U.S. Provisional Application No. 60/166,822 entitled, "Permeable MGO Nozzle", filed on Nov. 22, 1999.

FIELD OF THE INVENTION

The present invention relates to components for foundry and steel mill applications and, more particularly, to nozzles typically found in ladles and tundishes used for teeming molten metals.

BACKGROUND OF THE INVENTION

Ladles and tundishes used for teeming molten metal, for example, steel, require an outlet or outlets at the bottom thereof to direct the flow of the molten steel into a subsequent stage, e.g. a tundish, an inner mold, or continuous casting molds. These outlets are typically formed with special nozzles made of refractory material having good corrosion and erosion resistance. Control of the casting rates of the molten steel is generally carried out by means of either a stopper rod assembly or a slide gate system, both of which include similar refractory material. Nozzles for directing the flow of teeming molten steel generally have an inner insert or lining which has a bore for directing the flow of the molten steel therethrough.

Known nozzles made of alumina-silica, chrome-alumina, alumina-graphite or zirconia-graphite refractories have an inherent problem. Such materials have an affinity for impurities in steel, especially in aluminum kilned steels. Thus, when teeming molten steel from a tundish, the refractory material of the nozzle is susceptible to attack from non-ferrous constituents of the steel, particularly aluminum. These elements, which are present in molten steel, readily combine with oxygen at the temperature of molten steel to form oxides which collect and build-up in the bore of the nozzle which can ultimately lead to blockage of the bore. Oxidation of these reactive particles is exacerbated by the substantial aspiration of air into the nozzle which arises as a result of the vacuum generated by the molten steel as it enters into and flows down through the nozzle.

In an attempt to solve the blockage problem created by deposit build-ups, it is known to provide a nozzle which comprises a porous or permeable nozzle that is made of a refractory material, for example magnesium oxide ("MgO"). The permeable MgO nozzle is often encased in a metal housing for structural support. The metal housing has a fitting or port for the admission of an insert gas, for example, argon, into the nozzle. The gas flows first into a manifold around the nozzle. The manifold may be a relatively large chamber defined by the space between the nozzle and the inside of the metal housing. In other nozzles, the gas manifold may be one or more axial and/or circumferential distribution channels. Such distribution channels are often located adjacent an area in the nozzle bore where blockage tends to occur.

Gas flow through the permeable nozzle provides an important benefit. As the inert gas flows into the bore, the gas forms a thin boundary layer between the surface of the bore and the molten steel flowing therethough. The gas film in the bore first retards the buildup of deposits in the bore as the molten steel flows therethough. Thus, the gas layer protects the nozzle from attack or build up of non-ferrous particles in the molten steel. Further, the gas film "lubricates" the surface of the bore of the nozzle, thereby further facilitating the flow of gas therethough. The gas flow provides a further advantage of creating a positive pressure around the molten steel flow. That positive pressure diminishes the magnitude of the vacuum generated by the flow of steel through the nozzle and prevents the introduction of air into the molten steel, thereby preventing oxidation of the steel.

While known permeable MgO nozzles perform very well, there are still opportunities for even better performance. Problems have arisen both in manufacturing the nozzle and in service. MgO has a very high coefficient of thermal expansion in comparison to other refractory ceramic materials. A permeable nozzle made with a high purity form of MgO has a relatively thick wall. During its manufacture, the nozzle is exposed to a firing cycle; and the nozzle has a tendency to crack due to a temperature differential that occurs across the nozzle wall. Extreme measures must be taken to reduce this tendency. The cracks may be visible or subsurface and thus may not be discovered until the nozzle is machined. Thus, a nozzle may be rejected for cracks at different stages of its manufacturing process. When in service, cracks in the nozzle disrupt the uniform flow of gas through the insert and the formation of a uniform gas film within the bore of the nozzle. With some cracks, molten steel may penetrate the nozzle and the gas manifold. Thus, cracks in the nozzle diminish the effectiveness of the gas flow and shorten the life of the nozzle. In worst case situations, cracks may result in a structural failure of the nozzle.

The same high thermal expansion of MgO can cause other problems in some tundish gate systems. When the nozzle is heated as a result of the molten steel pouring though it, the nozzle expands. Because it is held in place in the radial direction by other refractories, axial expansion occurs forcing it down against the tundish gate system below it. Proper operation of the gate system is sometimes impaired due to the pressure applied by the expanded nozzle. Therefore, there is a need to provide a permeable nozzle made of MgO that can be reliably manufactured without thermal expansion problems.

Known permeable nozzles made with MgO have another weakness. During manufacture, the permeable nozzle is machined so that a uniform space or gap of approximately 0.060 inch to 0.200 inch is defined between the nozzle and the inner surface of the cylindrical metal can or housing surrounding the nozzle. A thin, uniform layer of a cementitious refractory mortar is inserted in a space or gap to secure the metal housing to the nozzle. A conventionally known air-drying mortar or a phosphoric-acid containing mortar is used. Thus, the metal housing encases the nozzle and, together with the mortar, structurally reinforces the nozzle. It is intended that the metal housing and mortar form a relatively airtight barrier over the gas manifolds in the nozzle. The cementitious refractory mortar is a heat setting mortar; and in the process of heat curing, the mortar tends to shrink. Adhesion to the smooth, machined nozzle body and the metal housing are challenged, and separation from either, or both, of these joints can occur resulting in gas leaks to the atmosphere. In addition, mortars are not dense refractories, but in themselves tend to be somewhat porous, especially when thinned to the degree of fluidity required to fill the small space between the nozzle body and the metal housing. The mortar shrinkage sometimes results in a crack which will cause a gas leak to atmosphere, and any gas leakage through the mortar dilutes the gas flow through the nozzle. Attempts to provide a thicker cementitious layer can result in excessive shrinkage and a release of the mortar layer from the nozzle and/or the metal housing. The above-described nozzle structure is expensive to manufacture and may result in nozzles that have weakened or defective gas flow systems. Consequently, there is a need for a nozzle construction that is generally less costly but provides a more reliable and consistent gas flow system.

SUMMARY OF THE INVENTION

The present invention provides a permeable nozzle that functions as a reliable conduit for pouring molten metal from a tundish or other receptacle over a long period of time. The permeable nozzle of the present invention is less expensive to manufacture, easier to check for gas leaks and has a greater thermal shock resistance than known permeable nozzles. The more controllable and reliable operation of the permeable nozzle of the present invention makes it especially useful in the continuous casting of steel.

According to the principles of the present invention and in accordance with the described embodiment, the present invention provides a permeable nozzle for directing a flow of molten metal from a tundish or other receptacle. The nozzle comprises about 50%–80% of about a 20–48×100 mesh MgO, about 5%–20% of about a 325 mesh MgO and about 5%–40% of about a 20–48×200 mesh MgO—$Al_2O_3$ spinel. The permeable nozzle has a nonservice backpressure of about 0.5–50 pounds per square inch ("psi") at gas flowrates of about 5–20 liters/minute. The addition of spinel to the MgO substantially increases thermal shock resistance of the permeable nozzle, and therefore, the permeable nozzle is substantially less susceptible to cracking during its manufacturing and expansion during service.

In another embodiment of the invention, the permeable nozzle is made by blending the above refractory particles and then mixing the blend with a plasticizer/binder and liquid until such blended mixture has a consistency tending to retain a fixed shaped after forming. The blended mixture is worked into a form of the permeable nozzle, the form is dried and then fired in a known manner. The firing is at a temperature sufficiently high to sinter the refractory particles together to form the permeable nozzle having a nonservice backpressure of about 0.5–50 psi at gas flowrates of about 5–20 liters/minute.

In a still further embodiment of the invention, a permeable nozzle comprises about 10%–20% of about a 20–48×100 mesh MgO, about 0%–10% of about a 325 mesh MgO, about 30%–60% of about a 28×48 mesh MgO—$Al_2O_3$ spine, about 10%–40% of about a 48×200 mesh MgO—$Al_2O_3$ spinel, and about 10%–20% of about a 325 mesh MgO—$Al_2O_3$ spinel. Again, the permeable nozzle has a nonservice backpressure of about 0.5–50 psi at gas flowrates of about 5–20 liters/minute. Anther embodiment includes a method of making such a permeable nozzle.

In a yet further embodiment of the invention, a permeable nozzle for directing a flow of molten metal from a tundish or other receptacle comprises a permeable nozzle insert made from MgO and MgO—$Al_2O_3$ spinel and has a nonservice backpressure of about 0.5–50 psi at gas flowrates of about 5–20 liters/minute. The permeable nozzle with a nonservice backpressure permits cracks and leaks to be readily detected during manufacture and installation of the permeable nozzle. This feature provides an additional advantage of placing only the highest quality and most reliable nozzles in service.

These and other objects and advantages of the present invention will become more readily apparent during the following detailed description taken in conjunction with the drawings herein.

BRIEF DESCRIPTION OF THE DRAWINGS

The accompanying drawings, which are incorporated in and constitute a part of this specification, illustrate embodiments of the invention and, together with a general description of the invention given above and the detailed description of the embodiments given below, serve to explain the principles of the invention.

DETAILED DESCRIPTION OF THE INVENTION

Figure 1:
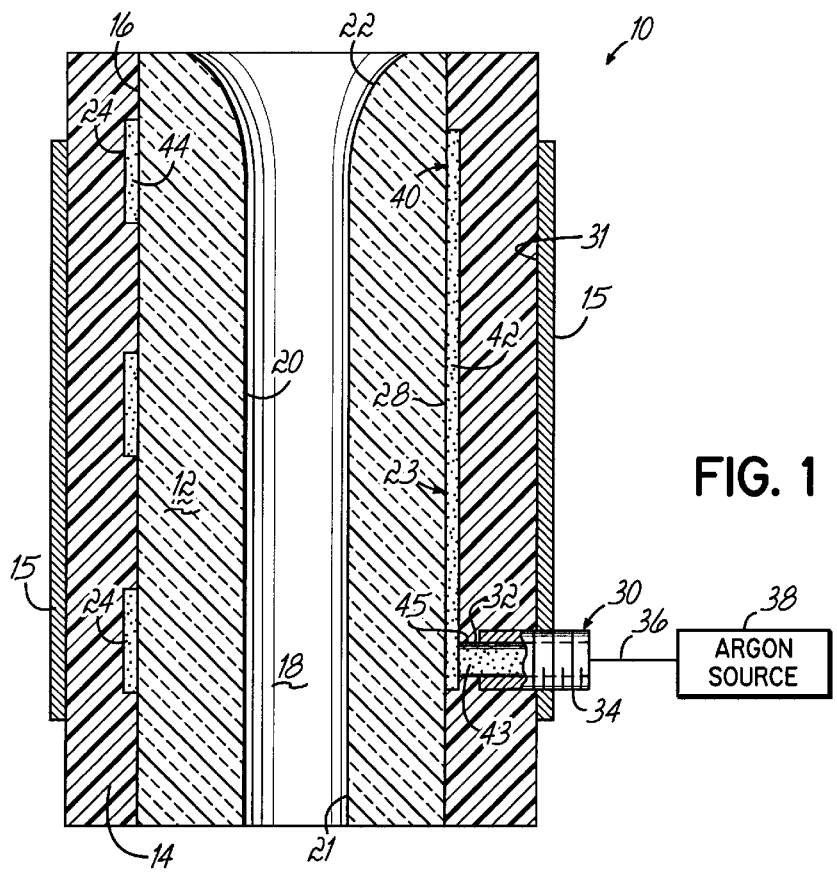
FIG. 1 is a centerline cross-sectional view of one embodiment of a permeable nozzle made in accordance with the principles of the present invention.

Referring now to the drawings wherein the showings are for the purpose of illustrating a preferred embodiment of the invention, and not for the purpose of limiting same, FIG. 1 shows a nozzle 10 for use in a tundish for teeming molten metal. Nozzle 10 is generally comprised of a permeable nozzle insert 12 of porous refractory material. A nozzle body is formed by a material 14, for example, a castable material, disposed between the nozzle insert 12 and a generally cylindrical metal can or housing 15. In the embodiment shown, housing 15 is formed from a low carbon steel and has a uniform wall thickness, for example, from 0.040 inch to 0.140 inch. The exact dimensions of the metal housing 15 will vary depending on the application in which the nozzle 10 is being used.

The nozzle insert 12 is generally cylindrical with an outer surface 16 and an elongated bore or opening 18 extending longitudinally therethough coincident with the longitudinal centerline of the nozzle insert 12. The bore 18 is defined by an inner surface 20. As best seen in FIG. 1, the opening 18 has a generally cylindrical portion 21 and includes a conical or flared portion 22 at the upper end or inlet of insert 12. Conical portion 22 is provided to facilitate passage of the molten metal through opening 18.

To provide gas flow to the permeable nozzle 12, a gas manifold 23 is disposed between the nozzle insert 12 and the material 14. The gas manifold 23 can have any desired configuration, and the configuration is normally determined by the application of the nozzle 10. In the embodiment of FIG. 1, the gas manifold 23 is comprised of one or more manifolds or channels 24 extending about the periphery of the nozzle insert 12, and a vertical channel or manifold 28 connects to the manifold 24. The position of channel 24 varies depending upon the size, configuration and function of the nozzle insert 12 as well as the location(s) at which impurities tend to build up within the nozzle insert 12 during use. A fitting 30 extends through the metal housing 15. The fitting 30 has an outlet 32 that extends beyond an inner surface 31 of the metal housing 15 and intersects gas manifold 23. An inlet 34 of the fitting 30 is adapted to be connected to a fluid line 36 which, in turn, is connected to a supply of pressurized inert gas, for example, argon.

Mineralogical Structure

The invention described and claimed herein addresses the tendency of known nozzles made of MgO to crack or expand in service. Refractories made from MgO, which are known in the industry as "basic" refractories, are the purest form of the group of refractories and exhibit excellent resistance to attack by molten metals. However, refractories made of MgO have drawbacks due to an inherent high thermal expansion and a low thermal conductivity which results in a low thermal shock resistance. Refractories made from another "basic" material, spinel, exhibit a lower thermal expansion and thus, have a higher thermal shock resistance than those made of MgO. Combinations of MgO and spinel reduce the drawbacks of pure MgO refractories without substantially affecting their performance.

Spinels are solid solutions of mixed oxides in the systems of $MgO-Al_2O_3$, $MgO-Cr_2O_3$ and $Cr_2O_3-Al_2O_3$. Solid solutions are inseparable mixtures that have physical properties quite different from their individual ingredients. They also do not have exact stoichiometric chemical formulas, but exist in a range of mixtures as dictated by the phase diagrams of these three systems. The $MgO-Al_2O_3$ spinel group is commercially available in crushed, sized, and ground particle size fractions in both sintered and fused varieties.

The thermal shock resistance of MgO refractories is enhanced by the addition of a spinel. The thermal shock resistance of alumina refractories is improved by the addition of mullite, a low thermal expansion phase in the alumina-silica family. However, spinel does not have the disadvantage of containing silica, a material that reduces the effectiveness and refractoriness of alumina refractories. Attempting to add mullite to MgO refractories would be disastrous because there is a low melting mixture in the $MgO-Al_2O_3-SiO_2$ system, cordierite, that turns to liquid at 1340° C. Spinel also has the advantage of being resistant to wetting by molten steel and resistant to $Al_2O_3$ buildup.

The morphology of crushed and sized MgO grain makes it difficult to manufacture a permeable nozzle with MgO. Due to its crystal structure, MgO grain is shard-like in appearance, much like broken glass. This structure causes pressing mixtures of MgO to be "short", that is, to have little plasticity; and thus, such pressing mixtures are difficult to form or press into shapes. To overcome this difficulty, organic binder concentrations are increased; and higher forming pressures are used to achieve the desired form and density of the final product. However, such increased forming pressures often require larger presses which, with the increased binder concentrations, increases manufacturing costs. Spinel, however, crystallizes in a more equiaxed or, less shard-like form, resulting in more workable pressing mixtures. The combination of the two materials, MgO and spinel, results in pressing mixtures that require less pressing forces and/or less plasticizer to form in the desired shapes. Thus, nozzles can be made with smaller presses and less plasticizer/binder, thereby reducing manufacturing costs.

The ratio of MgO to spinel is not fixed but can be adjusted to fit application requirements. To improve the thermal shock resistance during firing, a minimum of about a 5% spinel mix is necessary. For steel chemistry applications that are not particularly corrosive to refractories, up to about a 95% spinel mix can be used. A typical formula contains approximately 20% spinel to provide the correct balance between shock resistance, reduction in thermal expansion, resistance to alumina buildup, and corrosion resistance. For permeable refractories, the particle size distribution of the spinel grains should be in the same size range as the MgO particle size range to ensure a fine open porosity for the transmission of gas from the exterior of the nozzle to the inner bore surface 20.

Particle Size Distribution

The main purpose of the permeable nozzle is to provide a flow of argon through the nozzle and into the bore during the casting of steel. The particle sizes of materials used to make a known MgO nozzle are chosen to maximize gas flow through the pores of the nozzle consistent with a desired structural integrity of the nozzle. As such, a free flow porosity is achieved and demonstrated by a relative absence of gas flow backpressure in a known nozzle in a nonservice condition, that is, in the absence of a molten metal flow through the nozzle. For purposes of this description, a relative absence of gas flow backpressure is a backpressure of less than 0.5 psi.

A permeable nozzle providing a nonservice backpressure is able to provide secondary, highly important functions. One of those secondary functions is to assure that the argon is distributed to the desired portions of the longitudinal bore and is not distributed or leaked to other portions of the bore. Known permeable nozzles normally perform the above function. However, if a known permeable nozzle develops a gas leak while in service, the user cannot discriminate between normal gas flow and a leak. A leak causing an undesirable distribution of argon may result from a crack in the nozzle, a leak in the cementitious material surrounding the nozzle or at other areas in the nozzle. Such leaks will not be detected until impurities begin to build up in the nozzle and flow through the nozzle is impaired. In contrast, the presence of leaks in a permeable nozzle having a nonservice backpressure is detectable.

Another secondary function of the permeable nozzle is to limit the use of the argon to that required to provide the gas film on the nozzle bore's inner surface. The flow of molten metal through the nozzle can create forces that draw ambient air through a crack or leak in the nozzle and into the bore which can result in a lower quality steel product. To guarantee that air is not aspirated into the nozzle through a leak, the gas flow system is normally maintained under a positive pressure. In practice, as the nozzle is put into service, argon flow is increased until a backpressure is measured. However, if the nozzle has too much permeability, the argon gas flow exceeds that required to maintain the gas film in the bore of the nozzle. Such excess argon flow is wasteful and potentially detrimental to the process. For example, excess argon flow can produce unwanted turbulence in a continuous casting mold which may reduce the quality of the steel product. In contrast, a nozzle having less permeability will provide a desirable in-service backpressure with less gas flow, thereby limiting the use of argon to the desired amount.

The permeable nozzle insert 12 has a measurable backpressure at a desired gas flow in a nonservice mode and thus, performs all three of the above-described functions. For example, after the nozzle insert 12 has been manufactured, it can be connected to a plenum that seals on the upper and lower ends of the nozzle insert 12. The plenum is charged with an air pressure; and if the nozzle insert 12 is cracked, a desired backpressure will not be measured. Therefore, the nozzle insert can be determined to be defective.

Similarly, after the nozzle insert 12 has been secured in the metal housing 15, an air flow is then applied. If the desired backpressure is not measured, then either the nozzle insert is cracked or there is leakage between the nozzle insert 12 and the nozzle body 14 and/or the metal housing 15. In either event, the nozzle is defective and must be discarded or fixed. The gas flow backpressure can again be measured to check for leaks after the nozzle has been installed but before molten metal is poured therethough. Further, the backpressure can also be measured and tracked during and between periods of molten metal flow. Detecting variations in, or an absence of, backpressure, indicates a change in process conditions which should be brought to the attention of operators of the system. Thus, the measured backpressure shows immediately if there is a leak in the system either during manufacture of the nozzle insert 12 or in the field. A stoppage or reduction in gas flow can also be detected from a rise in the nominal backpressure.

To create a permeable nozzle insert 12 having a desired nonservice backpressure that performs all three desired functions, the grain size of the nozzle insert 12 must be modified to create a backpressure through the nozzle 10 instead of the "free flow" model of known nozzles. The desired backpressure is achieved by increasing the fine fraction of the particle mixture, so that the pores between the larger particles are partially filled in. With some nozzles, a desired backpressure may be about 0.5–2 psi at a gas flowrate of about 10–20 liters/minute. With other nozzles, a desired backpressure may be about 0.5–10 psi at a gas flowrate of about 5–20 liters/minute. Overall, backpressures may range from about 0.5–50 psi at gas flowrates of about 5–20 liters/minute. Overfilling the pores between the larger particles results in the nozzle insert losing its desired permeability. After the nozzle insert 12 is assembled into the nozzle 10, the backpressure at a desired flow can be measured with a backpressure measuring device. It can also be measured in service with a similar device.

An alternative method of introducing the fine porosity needed to achieve the desired permeability in the refractory is to add an organic material such as ground walnut shells or plastic fibers to the mixture. Such organic material will burn out during firing. These burn-out materials may be incorporated in a standard refractory grain sized formulation.

With nozzle inserts 12 having a nonservice backpressure as described above, cracks and leaks in the nozzle insert 12 and/or assembled nozzle 10 are readily detected while the nozzle 10 is being manufactured and installed. Thus, only the highest quality and most reliable permeable nozzles are placed into service, and such nozzles will have, on average, longer useful lives than known permeable nozzles. Further, with permeable nozzles of the present invention, argon usage is also reduced and limited to only that needed to create an argon film on the nozzle bore surface.

According to the present invention, nozzle insert 12 is comprised of magnesium oxide (MgO) particles and spinel, for example, an $MgO$—$Al_2O_3$ spinel. A nozzle insert 12 manufactured from sea-water or brine-produced magnesium oxide (MgO) and fused and sintered spinels would have the following chemical analysis:

| | |
|---|---|
| MgO | about 69.8% |
| CaO | about 0.2% |
| $SiO_2$ | about 0.1% |
| $Al_2O_3$ | about 29.8% |
| $Fe_2O_3$ | about 0.1% |

The materials other than MgO are impurities commonly found in these processed materials.

The sizing of the particles or grains used to form the nozzle insert 12 is fairly critical in order to achieve a nozzle insert 12 having a desired backpressure at a desired gas flow in a nonservice mode. For purposes of the description, a nonservice backpressure is defined as a backpressure that is measured in response to a gas flow through the nozzle 10 when the nozzle is not in service, that is, when there is no molten metal flowing through the nozzle. Such a nonservice backpressure can be measured when the nozzle 10 is being manufactured, after the nozzle has been installed in a ladle or other receptacle and during the periods between metal flows. Further, the nozzle insert 12 must be dense enough to provide excellent wear resistance and must have a lower coefficient of thermal expansion than known MgO permeable nozzles. To this end, nozzle insert 12 is comprised of a combination of magnesium oxide (MgO) and spinel particles. An example of a nozzle insert 12 having a lower coefficient of thermal expansion and providing a desired nonservice backpressure with good wear resistance is as follows:

EXAMPLE 1

| | | |
|---|---|---|
| MgO | about a 35 × 100 mesh | about 75% |
| MgO | about a 325 mesh | about 5%–10% |
| MgO—$Al_2O_3$ spinel | about a 48 × 200 mesh | about 20%–15% |

In Example 1, the MgO can be either dead-burned or fused; and the MgO—$Al_2O_3$ spinel can be either sintered or fused.

It will, of course, be understood that the present invention is not limited to the particle sizes or percentages disclosed above and that acceptable nozzle inserts may be produced with varying percentages of the above particle sizes. Though not specifically tested, it is believed that for Example 1, the following ranges of particle sizes would be acceptable to produce a satisfactory nozzle insert 12 of magnesium oxide (MgO) and a MgO—$Al_2O_3$ spinel in accordance with the present invention:

EXAMPLE 1

| | | |
|---|---|---|
| MgO | about a 20–48 × 100 mesh | about 50%–80% |
| MgO | about a 325 mesh | about 5%–20% |
| MgO—Al$_2$O$_3$ spinel | about a 20–48 × 200 mesh | about 5%–40% |

The magnesium oxide (MgO) particles and MgO—Al$_2$O$_3$ particles are thoroughly blended, then mixed with sufficient organic binder and liquid to retain a fixed shape after forming. The forming operation may be air-ramming, vibration-casting, mechanical or isostatic pressing or other means well known to those skilled in the art of refractory fabrication. The formed article is then dried or cured and subsequently fired to a temperature sufficiently high, for example, about 1500–1600° C. to sinter the refractory particles together to produce a strong shape. The firing also burns out the organic binder precursor ingredients. The drying and firing is accomplished by conventionally known methods.

The above example provides a nozzle insert having a nonservice backpressure of about 0.5–2 psi at a gas flowrate of about 10 liters/min. The permeability is a function of many process variables, for example, the size and amount the particles used, the type and mount of plasticizer/binder used, the pressing force of the press, etc. The permeability of the nozzle insert 12 is changed by changing the amount of the fine grained, 325 mesh MgO. For example, the nozzle insert is made more permeable by increasing the amount of the 325 mesh MgO and is made less permeable by decreasing the amount of the 325 mesh MgO. As will be appreciated, the proportions of the other particles must be adjusted inversely to the variation in the amount of the 325 mesh MgO used. The desired permeability is found by a process of experimentation in which process variables affecting permeability are adjusted until the desired nozzle insert is made.

Another example of a nozzle insert 12 having a lower coefficient of thermal expansion and providing a desired nonservice backpressure with good wear resistance is as follows:

EXAMPLE 2

| | | |
|---|---|---|
| MgO | about a 35 × 100 mesh | about 40–45% |
| MgO | about a 325 mesh | about 5%–10% |
| MgO—Al$_2$O$_3$ spinel | about a 28 × 48 mesh | about 15% |
| MgO—Al$_2$O$_3$ spinel | about a 48 × 200 mesh | about 35% |

In Example 2, the MgO can be either dead-burned or fused; and the MgO—Al$_2$O$_3$ spinel can be either sintered or fused.

Though not specifically tested, it is believed that for Example 2, the following ranges of particle sizes would be acceptable to produce a satisfactory nozzle insert 12 of magnesium oxide (MgO) and a MgO—Al$_2$O$_3$ spinel in accordance with the present invention:

EXAMPLE 2

| | | |
|---|---|---|
| MgO | about a 20–48 × 100 mesh | about 10%–20% |
| MgO | about a 325 mesh | about 0%–10% |
| MgO—Al$_2$O$_3$ spinel | about a 28 × 48 mesh | about 30%–60% |
| MgO—Al$_2$O$_3$ spinel | about a 48 × 200 mesh | about 10%–40% |
| MgO—Al$_2$O$_3$ spinel | about a 325 mesh | about 10%–20% |

The above materials are mixed and fired in a similar manner as that described with respect to Example 1 and provide a nozzle insert having a nonservice backpressure of about 0.5–2 psi at a gas flowrate of about 10 liters/min. As with Example 1, the proportions of the particles that provide a desired permeability are found by a process of experimentation in which process variables affecting permeability are adjusted until the desired permeable nozzle insert is made.

As will be appreciated by those skilled in the art, the size or shape of the insert 12 is not critical to the present invention which can find advantageous application in numerous and varied sizes and shapes. As will be further appreciated, the overall shape of nozzle 10 and/or insert 12 is determined by the particular casting machine or system with which it is to be used.

Nozzle Assembly

A known problem in the assembly of known permeable nozzles is the seal with the metal housing 15. Gas leaks in this area are commonplace and difficult to eliminate. In service, such leaks can mask a nonfunctioning nozzle by showing gas flow on the flow meter, when, in fact, the gas is leaking from the interface between the nozzle and the metal housing or at the fitting on the metal housing. This seal is generally made with a mortar, either an air set mortar or a phosphate bonded mortar. The phosphate bonded mortar is a heat setting mortar that requires the mortar be heated in a high temperature oven to set the mortar. However, the phosphate bonded mortar has an advantage of bonding to the metal housing better than the air set type, thereby providing a better gastight seal. Unfortunately, both types of mortar do not reliably provide a gastight seal. The fine grain size distribution and high moisture content of all mortars result in a high degree of intrinsic porosity and a tendency to shrink when heated. The resultant seal can thus be easily compromised resulting in a leak.

The present invention further comprises a structure of a nozzle insert that is highly resistant to cracks and gas leaks. As earlier described, one source of leaks in known permeable nozzles is the cracks that occur during the firing process. The tendency for the nozzle to crack can be reduced by reducing the wall thickness of the nozzle, thereby reducing the temperature differential across the nozzle wall during the firing process. Another source of gas leaks in known nozzles is the mortar joint between the nozzle and the metal housing. Therefore, the nozzle 10 is comprised of a thin-wall nozzle insert 12 that is surrounded by the nozzle body 14. The nozzle body 14 is a refractory of graded grain sizes of one or more refractory materials that flow under vibration and create a dense refractory body. The material 14 may be a chemical or hydraulic bonded castable material, a low cement castable material, a no cement castable material, or other suitable material. For example, "UNICAST LC" low cement castable from United Refractories of Cincinnati, Ohio. Further, the material 14 is chosen to provide a significant structural element when disposed between the thin-walled nozzle insert and the metal housing 15. The material 14 provides excellent sealing properties with the nozzle insert 12. Further, the material 14 has a very low permeability, and therefore, the interface between the material 14 and the metal housing 15 is normally not a source of a gas leak.

The use of the material 14 reduces the probability of occurrence of gas leaks. The fitting 30 extends substantially beyond an inner wall 31 of the metal housing 15, for example, at least 0.250 inch, before it intersects gas manifold 23. Casting of the material 14 around the extended portion of the fitting 30 creates a substantial sealing area around the fitting 30 thus making the fitting highly resistant to gas leaks. The unmachined, rough textured, outer surface 16 of the nozzle insert 12 provides a good bonding surface for the material 14 and also provides an excellent sealing interface between the nozzle insert 12 and the material 14. Thus, the use of the material 14 provides excellent and reliable, relatively airtight, sealing interfaces that prevent first, gas leakage to atmosphere and second, an ingress of ambient air.

To form the desired gas manifold 23, strips of wax 40 are placed on the outer surface 16 of the nozzle insert 12. While any configuration of wax strips may be used, a configuration often used is comprised of a first wax strip 42 that extends longitudinally along the outer surface 16. One end of the wax strip 42 is located so that it intersects one end of a wax pencil or rod 43. The opposite end of the wax rod 43 intersects the inner end or outlet 32 of the gas fitting 30. The wax strip 42 also intersects other wax strips 44 which may extend annularly around the nozzle insert 12. Thus, the wax strips 40 are positioned on the outer surface 16 of the nozzle insert 12 to form the desired gas manifold 23. The cross-sectional area of a gas manifold 23 corresponds to the cross-sectional area of the wax strips 40. Therefore, the size of the manifold 23 and the resulting gas flow therethough is varied by using wax strips 40 of different widths and thicknesses. The wax strips can be cut from sheets of wax to the desired size. As will be appreciated, materials other than wax, for example, expandable plastic mesh, may alternatively be used.

After the wax strips 40 have been applied to the permeable nozzle insert 12 to define the gas manifold 23, the nozzle insert 12 is ready to receive the material. While the metal housing 15 is used to contain the material around a substantial portion of the nozzle insert 12, molds are required to contain the material 14 around other parts of the nozzle insert 12, for example, the top and bottom. The nozzle insert 12 with the wax strips thereon and necessary molds are placed on a vibrating table. The cylindrical housing 15 is then placed on the vibrating table surface such that the nozzle insert 12 is approximately centered within the metal housing 15. Other molds are then placed as required. The metal housing 15 and molds are clamped or secured to restrain any motion that might be induced from the vibrating table.

The material 14 is then made or prepared for pouring. The vibrating table is turned on and the material 14 is slowly dispensed or poured into the annular space between the nozzle insert 12 and the metal housing 15. A vibration frequency is dependent on the material used and can be determined by experiment. A frequency of 3600 vibrations/minute is often used. The vibration amplitude is also determined experimentally and is a function of the distance between the nozzle insert 12 and the metal housing 15, the type of material being used, the size of the orifice through which the material is being poured, etc. The process of pouring and vibrating the material 14 around the nozzle insert takes from approximately 5 minutes to approximately 10 minutes. If the material 14 is cold setting, after setting, the molds are removed; and the assembly is placed in a drying oven and heated to a sufficient temperature, for example, 250° F.–300° F. If the material 14 is heat setting, it is placed in an oven to set. During the drying or heating processes, the wax strips 42, 44, 43 melt, thereby forming the channels 24, 28, 45 of the gas manifold 23. Much of the melted wax runs out of the fitting 30; and some of the wax disperses into the nozzle insert 12 to be vaporized when the nozzle 10 is put into service.

The nozzle construction described above provides numerous advantages over known permeable nozzles made of MgO. The addition of spinel to the MgO provides a mix that has a substantially increased thermal shock resistance. Therefore, a permeable nozzle insert 12 made from the MgO-spinel mix is substantially less susceptible to cracking during the manufacturing process and expansion during service.

The use of a material 14, with its increased wall thickness, provides several further advantages. First, the material 14 being made from a graded coarse grain formula is very dense; and further, it does not shrink at elevated temperatures. Therefore, the material 14 is intrinsically gastight and substantially less permeable than the nozzle insert 12. Second, the larger space between the nozzle insert 12 and the metal housing 15 eliminates the expensive and labor intensive machining of known nozzles required to achieve the relatively tight dimensional tolerances between known nozzles and the metal housing. Third, the cold set feature eliminates the need for a high temperature oven setting. Fourth, the gas manifold 23 is formed in the material 14 as part of the casting process, thereby eliminating the costly machining of gas manifolds in known nozzles. Further, different manifold patterns are easily and inexpensively created. Fifth, the material 14 becomes a substantial, structural and integral part of the nozzle 10 in addition to the nozzle insert 12. In some applications, the material 14 may be substantial enough to permit the metal housing 15 to be eliminated.

The nozzle insert 12 is made to have a nonservice backpressure so that cracks and leaks can be readily detected during manufacture and installation of the nozzle 10. This feature provides an additional advantage of being able to place only the highest quality and most reliable nozzles in service.

Figure 2:
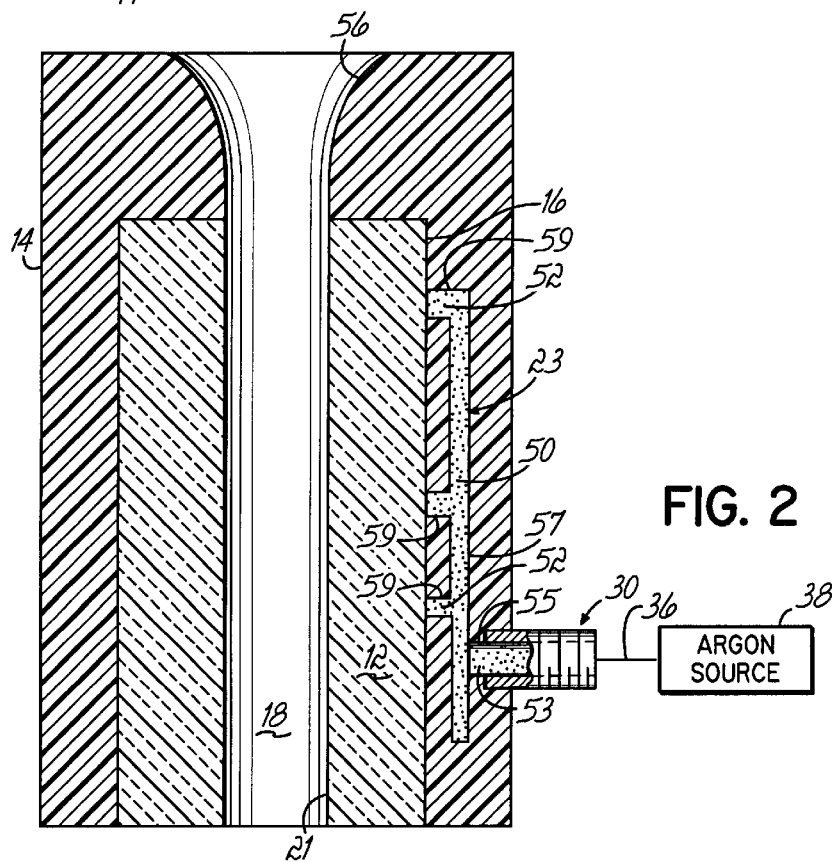
FIG. 2 is a centerline cross-sectional view of one embodiment of a permeable nozzle made in accordance with the principles of the present invention.

While the invention has been illustrated by the description of at least one embodiment, and while the description is in considerable detail, there is no intention to restrict nor in any way limit the scope of the appended claims to such detail. Additional advantages and modifications will readily appear to those who are skilled in the art. For example, in FIG. 1, the gas manifold 23 is disposed at the interface between the nozzle insert 12 and the material 14. As shown in FIG. 2, the gas manifold 23 may be wholly located within the material 14. In a manner similar to that described with respect to the gas manifold 23 of FIG. 1, prior to applying the material 14 around the nozzle insert 12, a first pencil, or piece, of wax 50 is mounted longitudinally in the space around the nozzle insert 12 in which the material is to be applied. Further, one or more second pieces of wax 52 are mounted in the same space in such a manner that they extend between, and intersect, the first piece of wax 50 and the outer surface 16 of nozzle insert 12. Another wax rod 53 extends between the wax rod 50 and the outlet 32 of the fitting 30. Thereafter, the material 14 is vibrated into place as previously described. During either a heating setting or drying cycle, the pieces of wax melt to form channels 55, 57, 59 of the gas manifold 23. Much of the melted wax runs out of the nozzle 10, but some of the melted wax disperses into the nozzle insert 12 to be vaporized upon the nozzle 10 being put into service. Therefore, as will be appreciated, any configuration of gas manifolds can be provided within the structure of the material 14.

FIG. 2 illustrates another alternative embodiment of the present invention in which the material 14 provides a sufficiently substantial structure that the metal housing 15 of FIG. 1 is eliminated and not used. With this embodiment, an outer cylindrical mold is used in the casting process instead of the metal housing as described with respect to FIG. 1. Further, the fitting 30 is supported by the outer cylindrical mold during the casting process. When set, the material 14 sealing surrounds the fitting 30 such that gas cannot escape around the outside of the fitting 30.

In a still further alternative embodiment, referring to FIG. 2, the flared inlet portion 56 is cast into the material 14 instead of being part of the nozzle insert 12. With this embodiment, an inside core is used in a known manner to form the flared inlet portion 56. It should be noted that the different features in FIG. 1 may be combined with features of FIG. 2. For example, the metal housing 15 of FIG. 1 may be used with the nozzle construction shown in FIG. 2; and the flared construction of the material of FIG. 2 may be used with the gas manifold configuration of FIG. 1.

Therefore, the invention in its broadest aspects is not limited to the specific details shown and described. Consequently, departures may be made from the details described herein without departing from the spirit and scope of the claims which follow.

What is claimed is:

1. A permeable nozzle for directing a flow of molten metal from a tundish or other receptacle comprising about 50%–80% of about a 20–48×100 mesh MgO, about 5%–20% of about a 325 mesh MgO and about 5%–40% of about a 20–48×200 mesh MgO—Al$_2$O$_3$ spinel, the permeable nozzle having a nonservice backpressure of about 0.5–50 psi at gas flowrates of about 5–20 liters/minute.

2. The permeable nozzle of claim 1 wherein the permeable nozzle has a nonservice backpressure of about 1–10 psi at gas flowrates of about 5–20 liters/minute.

3. The permeable nozzle of claim 1 comprising about 75% of about a 35×100 mesh MgO, about 5%–20% of about a 325 mesh MgO and about 15%–20% of about a 48×200 mesh MgO—Al$_2$O$_3$ spinel.

4. A method of making a permeable nozzle comprising:
blending a mixture of refractory particles of about 50%–80% of about a 20–48×100 mesh MgO, about 5%–20% of about a 325 mesh MgO and about 5%–40% of about a 20–48×200 mesh MgO—Al$_2$O$_3$ spinel;
mixing a plasticizer/binder and liquid with the blended mixture such that the blended mixture has a consistency tending to retain a fixed shaped after forming;
working the blended mixture into a form of the permeable nozzle;
drying the form of the permeable nozzle; and
firing the dried form of the permeable nozzle at a temperature sufficiently high to sinter the refractory particles together to form the permeable nozzle having a nonservice backpressure of about 0.5–50 psi at gas flowrates of about 5–20 liters/minute.

5. A permeable nozzle comprising about 50%–80% of about a 20–48×100 mesh MgO, about 5%–20% of about a 325 mesh MgO and about 5%–40% of about a 20–48×200 mesh MgO—Al$_2$O$_3$ spinel, the permeable nozzle having a nonservice backpressure of about 0.5–50 psi at gas flowrates of about 5–20 liters/minute and the permeable nozzle being made by the method of:
blending a mixture of refractory particles of about 50%–80% of about a 20–48×100 mesh MgO, about 5%–20% of about a 325 mesh MgO and about 5%–40% of about a 20–48×200 mesh MgO—Al$_2$O$_3$ spinel;
mixing a plasticizer/binder and liquid with the blended mixture such that the blended mixture has a consistency tending to retain a fixed shaped after forming;
working the blended mixture into a form of the permeable nozzle;
drying the form of the permeable nozzle; and
firing the dried form of the permeable nozzle at a temperature sufficiently high to sinter the refractory particles together to form the permeable nozzle.

6. A permeable nozzle for directing a flow of molten metal from a tundish or other receptacle comprising:
a permeable nozzle insert having an inner surface defining a bore extending therethrough and an outer surface, the permeable nozzle comprising about 50%–80% of about a 20–48×100 mesh MgO, about 5%–20% of about a 325 mesh MgO and about 5%–40% of about a 20–48×200 mesh MgO—Al$_2$O$_3$ spinel, the permeable nozzle insert having a nonservice backpressure of about 0.5–50 psi at gas flowrates of about 5–20 liters/minute;
a metal housing surrounding a portion of the permeable nozzle insert and forming a space between the metal housing and the permeable nozzle insert;
a fitting mounted in and extending through the metal housing, the fitting having an outlet extending into the space, the fitting adapted to be connected to a source of inert gas and in fluid communication with the outer surface of the permeable nozzle insert, thereby providing a flow of the inert gas to the permeable nozzle insert; and
a material disposed in the space between the metal housing and the permeable nozzle insert and being cast around the outlet of the fitting extending between the metal housing and the permeable nozzle.

7. A permeable nozzle for directing a flow of molten metal from a tundish or other receptacle comprising:

a permeable nozzle insert having an inner surface defining a conduit extending therethrough and an outer surface, the permeable nozzle comprising about 10%–20% of about a 20–48×100 mesh MgO, about 0%–10% of about a 325 mesh MgO, about 30%–60% of about a 28×48 mesh MgO—Al$_2$O$_3$ spinel, about 10%–40% of about a 48×200 mesh MgO—Al$_2$O$_3$ spinel, and about 10%–20% of about a 325 mesh MgO—Al$_2$O$_3$ spinel, the permeable nozzle insert having a nonservice backpressure of about 0.5–50 psi at gas flowrates of about 5–20 liters/minute;

a metal housing surrounding a portion of the permeable nozzle insert and forming a space between the metal housing and the permeable nozzle insert;

a fitting mounted in and extending through the metal housing, the fitting having an outlet extending into the space, the fitting adapted to be connected to a source of inert gas and in fluid communication with the outer surface of the permeable nozzle insert, thereby providing a flow of the inert gas to the permeable nozzle insert; and a material disposed in the space between the metal housing and the permeable nozzle insert and being cast around the outlet of the fitting extending between the metal housing and the permeable nozzle.

8. A permeable nozzle for directing a flow of molten metal from a tundish or other receptacle comprising:

a permeable nozzle insert having an inner surface defining a conduit extending therethrough and an outer surface, the permeable nozzle comprising MgO and MgO—Al$_2$O$_3$ spinel, and the permeable nozzle insert having a nonservice backpressure of about 0.5–50 psi at gas flowrates of about 5–20 liters/minute;

a metal housing surrounding a portion of the permeable nozzle insert and forming a space between the metal housing and the permeable nozzle insert;

a fitting mounted in and extending through the metal housing, the fitting having an outlet extending into the space, the fitting adapted to be connected to a source of inert gas and in fluid communication with the outer surface of the permeable nozzle insert, thereby providing a flow of the inert gas to the permeable nozzle insert; and a material disposed in the space between the metal housing and the permeable nozzle insert and being cast around the outlet of the fitting extending between the metal housing and the permeable nozzle.

9. The permeable nozzle of claim 6 wherein the material has a wall thickness between the permeable nozzle insert and the metal housing of at least 0.250 inch.

10. The permeable nozzle of claim 6 wherein the fitting extends past an inner surface of the metal housing by at least 0.250 inch.

11. The permeable nozzle of claim 6 further comprising a gas manifold disposed between the permeable nozzle insert and the material.

12. The permeable nozzle of claim 6 wherein a gas manifold disposed within the material.

13. The permeable nozzle of claim 8 further comprising a gas manifold having at least one channel formed in the material in fluid communication with the fitting and the permeable nozzle insert.

14. The permeable nozzle of claim 13 wherein the gas manifold comprises a plurality of spaced apart channels formed in the material in fluid communication with the fitting and the permeable nozzle insert.

15. The permeable nozzle of claim 14 wherein the plurality of spaced apart channels include at least one axial channel and at least one annular channel, the axial channel being in fluid communication with the annular channel, whereby the inert gas passes through the fitting, the axial and annular channels and the permeable nozzle insert.

16. A permeable nozzle for directing a flow of molten metal from a tundish or other receptacle comprising about 10%–20% of about a 20–48×100 mesh MgO, about 0%–10% of about a 325 mesh MgO, about 30%–60% of 28×48 mesh MgO—Al$_2$O$_3$ spinel, about 10%–40% of about a 48×200 mesh MgO—Al$_2$O$_3$ spinel, and about 10%–20% of about a 325 mesh MgO—Al$_2$O$_3$ spinel, the permeable nozzle having a nonservice backpressure of about 0.5–50 psi at gas flowrates of about 5–20 liters/minute.

17. The permeable nozzle of claim 16 wherein the permeable nozzle has a nonservice backpressure of about 1–10 psi at gas flowrates of about 5–20 liters/minute.

18. The permeable nozzle of claim 16 comprising about 40%–45% of about a 35×100 mesh MgO, about 5%–10% of about a 325 mesh MgO, about 15% of about a 28×48 mesh MgO—Al$_2$O$_3$ spinel and about 35% of about a 48×200 mesh MgO—Al$_2$O$_3$ spinel.

19. A method of making a permeable nozzle comprising:

blending a mixture of refractory particles of about 10%–20% of about a 20–48×100 mesh MgO, about 0%–10% of about a 325 mesh MgO, about 30%–60% of about a 28×48 mesh MgO—Al$_2$O$_3$ spinel, about 10%–40% of about a 48×200 mesh MgO—Al$_2$O$_3$ spinel, and about 10%–20% of about a 325 mesh MgO—Al$_2$O$_3$ spinel;

mixing a plasticizer/binder and liquid with the blended mixture such that the blended mixture has a consistency tending to retain a fixed shaped after forming;

working the blended mixture into a form of the permeable nozzle;

drying the form of the permeable nozzle; and firing the dried form of the permeable nozzle at a temperature sufficiently high to sinter the refractory particles together to form the permeable nozzle having a nonservice backpressure of about 0.5–50 psi at gas flowrates of about 5–20 liters/minute.

20. A permeable nozzle comprising about 10%–20% of about a 20–48×100 mesh MgO, about 0%–10% of about a 325 mesh MgO, about 30%–60% of about a 28×48 mesh MgO—Al$_2$O$_3$ spinel, about 10%–40% of about a 48×200 mesh fused MgO—Al$_2$O$_3$ spine, and about 10%–20% of about a 325 mesh MgO—Al$_2$O$_3$ spinel, the permeable nozzle having a nonservice backpressure of about 0.5–50 psi at gas flowrates of about 5–20 liters/minute and the permeable nozzle being made by the method of:

blending a mixture of refractory particles of about 10%–20% of about a 20–48×100 mesh MgO, about 0%–10% of about a 325 mesh MgO, about 30%–60% of about a 28×48 mesh MgO—Al$_2$O$_3$ spinel, about 10%–40% of about a 48×200 mesh fused MgO—Al$_2$O$_3$ spinel, and about 10%–20% of about a 325 mesh MgO—Al$_2$O$_3$ spinel;

mixing a plasticizer/binder and liquid with the blended mixture such that the blended mixture has a consistency tending to retain a fixed shaped after forming;

working the blended mixture into a form of the permeable nozzle;

drying the form of the permeable nozzle; and firing the dried form of the permeable nozzle at a temperature sufficiently high to sinter the refractory particles together to form the permeable nozzle.

21. The permeable nozzle of claim 8 wherein the permeable nozzle has a nonservice backpressure of about 1–10 psi at gas flowrates of about 5–20 liters/minute.

22. The permeable nozzle of claim 1 wherein the permeable nozzle has a nonservice backpressure of about 0.5–2 psi at gas flowrates of about 5–20 liters/minute.

23. A permeable nozzle for directing a flow of molten metal from a tundish or other receptacle comprising:

a permeable nozzle insert having an inner surface defining a conduit extending therethrough and an outer surface, the permeable nozzle comprising MgO and MgO—$Al_2O_3$ spinel, and the permeable nozzle insert having a nonservice backpressure of about 0.5–50 psi at gas flowrates of about 5–20 liters/minute;

a housing surrounding a portion of the permeable nozzle insert and forming a space between the housing and the permeable nozzle insert;

a fitting mounted in and extending through the housing, the fitting comprising an outlet extending into the space, and the fitting is adapted to be connected to a source of inert gas; and a nozzle body material disposed in the space between the metal housing and the permeable nozzle insert, the nozzle body material comprising a channel extending over the outer surface of the nozzle insert, the channel being in fluid communication with the outlet of the fitting and providing a flow of the inert gas to the permeable nozzle insert.

24. The permeable nozzle of claim 23 wherein the nozzle body material further comprises a plurality of channels extending over the outer surface of the nozzle insert and in fluid communication with the outlet of the fitting.

25. The permeable nozzle of claim 23 wherein the nozzle body material is cast around the outlet of the fitting extending between the housing and the permeable nozzle.

26. The permeable nozzle of claim 23 wherein the nozzle insert further comprises about 50%–80% of about a 20–48×100 mesh MgO, about 5%–20% of about a 325 mesh MgO and about 5%–40% of about a 20–48×200 mesh MgO—$Al_2O_3$ spinel, the permeable nozzle insert having a nonservice backpressure of about 0.5–50 psi at gas flowrates of about 5–20 liters/minute.

27. The permeable nozzle of claim 23 wherein the nozzle insert further comprises about 10%–20% of about a 20–48×100 mesh MgO, about 5%–20% of about a 325 mesh MgO, about 30%–60% of about a 28×48 mesh MgO—$Al_2O_3$ spinel, about 10%–40% of about a 48×200 mesh MgO—$Al_2O_3$ spinel, and about 10%–20% of about a 325 mesh MgO—$Al_2O_3$ spine, the permeable nozzle insert having a nonservice backpressure of about 0.5–50 psi at gas flowrates of about 5–20 liters/minute.

28. A method of making a permeable nozzle comprising:

blending a mixture of refractory particles comprising MgO and MgO—$Al_2O_3$ spinel;

mixing a plasticizer/binderand liquid with the blended mixture such that the blended mixture has a consistency tending to retain a fixed shaped after forming;

working the blended mixture into a permeable nozzle form;

drying the permeable nozzle form;

firing the permeable nozzle form at a temperature sufficiently high to sinter the refractory particles together to form a permeable nozzle having a nonservice backpressure of about 0.5–50 psi at gas flowrates of about 5–20 liters/minute;

placing a formable material on an outer surface of the permeable nozzle at a desired location for an inert gas flow channel;

placing a housing around the permeable nozzle, the housing having a fitting mounted in and extending through the housing, the fitting having an outlet immediately adjacent the material;

disposing a nozzle body material in a space between the housing and the permeable nozzle; and melting the formable material to provide the inert gas flow channel in the casting material on the outer surface of the permeable nozzle.

* * * * *

UNITED STATES PATENT AND TRADEMARK OFFICE
CERTIFICATE OF CORRECTION

PATENT NO.    : 6,491,190 B1  Page 1 of 1
DATED         : December 10, 2002
INVENTOR(S)   : Bruce E. Dunworth It is certified that error appears in the above-identified patent and that said Letters Patent is hereby corrected as shown below:

<u>Column 3,</u>
Line 61, delete "spine" and insert therefor -- spinel --.

<u>Column 15,</u>
Line 61, delete "claim 8" and insert therefor -- claim 6 --.

<u>Column 16,</u>
Line 52, delete "spine" and insert therefor -- spinel --.

<u>Column 18,</u>
Line 9, delete "5%-20%" and insert therefor -- 0%-10% --.
Line 14, delete "spine" and insert therefor -- spinel --.
Line 20, delete "plasticizer/binderand" and insert therefor -- plasticizer/binder and --.

Signed and Sealed this

Twelfth Day of August, 2003

JAMES E. ROGAN
*Director of the United States Patent and Trademark Office*